United States Patent
Quitmann et al.

(10) Patent No.: US 11,994,107 B2
(45) Date of Patent: May 28, 2024

(54) OSCILLATION DAMPING IN WIND POWER INSTALLATIONS

(71) Applicant: Wobben Properties GmbH, Aurich (DE)

(72) Inventors: Eckard Quitmann, Bremen (DE); Sönke Engelken, Bremen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/398,774

(22) Filed: Aug. 10, 2021

(65) Prior Publication Data

US 2022/0049679 A1    Feb. 17, 2022

(30) Foreign Application Priority Data

Aug. 14, 2020 (EP) ...................................... 20191101

(51) Int. Cl.
*F03D 7/02* (2006.01)
*F03D 7/04* (2006.01)
*F03D 9/25* (2016.01)

(52) U.S. Cl.
CPC ......... *F03D 7/0284* (2013.01); *F03D 7/0272* (2013.01); *F03D 7/048* (2013.01); *F03D 9/257* (2017.02); *F05B 2270/337* (2013.01)

(58) Field of Classification Search
CPC ...... F03D 7/0272; F03D 7/0284; F03D 7/048; F03D 9/257; F05B 2270/337
See application file for complete search history.

(56) References Cited

U.S. PATENT DOCUMENTS

| | | | | |
|---|---|---|---|---|
| 4,417,194 A | * | 11/1983 | Curtiss ................. | H02J 3/1835 322/29 |
| 5,083,039 A | * | 1/1992 | Richardson ............ | H02J 3/381 290/55 |
| 5,907,192 A | * | 5/1999 | Lyons ................... | F03D 7/0268 290/43 |
| 6,566,764 B2 | * | 5/2003 | Rebsdorf ............. | F03D 7/0284 290/55 |

(Continued)

FOREIGN PATENT DOCUMENTS

| CA | 3089179 A1 | * | 8/2019 | ............. H02J 3/001 |
|---|---|---|---|---|
| EP | 3322061 A1 | | 5/2018 | |

OTHER PUBLICATIONS

Wikipedia entry for Kalman Filters, published Jul. 11, 2020. Obtained from Wayback Machine on Jul. 19, 2023. (Year: 2020).*

(Continued)

*Primary Examiner* — Tulsidas C Patel
*Assistant Examiner* — Thomas K Quigley
(74) *Attorney, Agent, or Firm* — Seed IP Law Group LLP

(57) ABSTRACT

Provided is a control unit for a converter, in particular of a wind power installation and/or of a wind farm, comprising: an input for receiving a detected voltage and/or a detected current, an input for receiving a voltage set point and/or a current set point, an input for receiving a correction value and a feedback control system which is set up, depending on the detected voltage and/or the detected current and the voltage set point and/or the current set point and the correction value, to produce a reactive power set point for a modulated, preferably amplitude-modulated reactive and/or active power of the converter.

14 Claims, 6 Drawing Sheets

(56) References Cited

U.S. PATENT DOCUMENTS

| | | | | |
|---|---|---|---|---|
| 6,784,634 B2 * | 8/2004 | Sweo | ............... | H02P 21/34 322/29 |
| 6,853,094 B2 * | 2/2005 | Feddersen | ............... | F03D 9/255 322/29 |
| 6,856,040 B2 * | 2/2005 | Feddersen | ............... | F03D 9/255 290/55 |
| 6,856,041 B2 * | 2/2005 | Siebenthaler | ......... | F03D 7/0224 290/55 |
| 6,933,625 B2 * | 8/2005 | Feddersen | ............... | F03D 7/0224 290/55 |
| 7,015,595 B2 * | 3/2006 | Feddersen | ............... | F03D 7/0224 322/29 |
| 7,102,247 B2 * | 9/2006 | Feddersen | ............... | H02P 9/105 363/21.01 |
| 7,180,270 B2 * | 2/2007 | Rufer | ............... | H02P 9/30 290/44 |
| 7,304,400 B2 * | 12/2007 | Kang | ............... | H02P 9/009 322/29 |
| 7,345,373 B2 * | 3/2008 | Delmerico | ............ | F03D 7/0276 290/44 |
| 7,425,771 B2 * | 9/2008 | Rivas | ............... | H02P 21/22 290/55 |
| 7,471,007 B2 * | 12/2008 | Bucker | ............... | H02P 9/42 322/29 |
| 7,622,815 B2 * | 11/2009 | Rivas | ............... | H02P 9/102 290/55 |
| 7,761,190 B2 * | 7/2010 | Delmerico | ............. | F03D 9/255 415/905 |
| 8,373,293 B2 * | 2/2013 | Engelhardt | ............. | F03D 9/255 290/44 |
| 9,590,547 B2 * | 3/2017 | Lu | ............... | H02H 7/06 |
| 9,705,440 B2 * | 7/2017 | Rozman | ............... | H02P 9/00 |
| 2004/0217596 A1 * | 11/2004 | Feddersen | ............... | F03D 9/255 290/44 |
| 2018/0138708 A1 * | 5/2018 | De Rijcke | ................ | H02J 3/50 |
| 2018/0363629 A1 | 12/2018 | Kjær et al. | | |

OTHER PUBLICATIONS

Wikipedia entry for Alpha Beta Filters, published Jun. 9, 2020. Obtained from Wayback Machine on Jul. 19, 2023. (Year: 2020).*

Shair et al., "Extracting Time-Varying Subsynchronous Oscillation in Wind Power Systems Through Kalman Filtering," IEEE PES Innovative Smart Grid Technologies Asia, 2019, pp. 3162-3167.

Wang et al., "Coordinated Elimination Strategy of Low Order Output Current Distortion for LC-Filtered DFIG System Based on Hybrid Virtual Impedance Method," IEEE Transactions on Power Electronics, vol. 34, No. 8, Aug. 2019, pp. 7502-7520.

* cited by examiner

OSCILLATION DAMPING IN WIND POWER INSTALLATIONS

BACKGROUND

Technical Field

The present invention relates to a control unit of a wind power installation and/or of a wind farm, in particular an oscillation damping.

Description of the Related Art

Wind power installations are commonly known and are usually operated as producers within an electrical supply network, i.e., they feed electrical power into the electrical supply network.

Electrical supply networks, commonly also referred to as a power grid, are a complex network for transmitting and distributing electrical energy.

Spatially (widely) extended electrical supply networks which usually have a plurality of voltage levels, which are connected to one another in both a horizontal and a vertical manner, are also referred to as interconnected systems, for example the UCTE system, or western USA and Canada.

However, in unfavorable circumstances, this very spatial extension can result in electromechanical vibrations which run through the entire interconnected system. One example of vibrations of this type are the so-called network oscillations which manifest themselves as a result of an excitation of the interconnected system in the form of frequency oscillations and power oscillations with a characteristic cycle duration.

However, these network oscillations must be sufficiently damped in order to ensure safe and stable operation of the interconnected system.

Network oscillations of this type are currently only encountered in certain conventional power stations with a so-called power system stabilizer (PSS).

However, in the context of the increasing number of renewable and non-conventional producers, this seems to be insufficient for network safety.

BRIEF SUMMARY

Damping electromechanical vibrations between producers, and in particular the generators or network regions thereof, by means of wind power installations is provided herein.

A control unit (controller) of a wind power installation and/or of a wind farm is thus proposed, comprising: an input for receiving a detected voltage and/or a detected current, an input for receiving a voltage set point and/or a current set point, an input for receiving a correction value and a feedback control system which is set up, depending on the detected voltage and/or the detected current and the voltage set point and/or the current set point and the correction value (Bi), to produce a reactive power set point (Qset) for a modulated, preferably amplitude-modulated, reactive and/or active power of the converter.

In particular, a control unit for a converter of a wind power installation or a wind farm is therefore proposed which is set up to counteract electromechanical vibrations, in particular in the form of network oscillations (or inter area oscillations), or to damp them.

Damping the network oscillations therefore preferably takes place by means of a reactive power setting, alternatively and/or additionally by way of an active power setting.

In particular, a modulated, in particular amplitude-modulated, reactive and/or active power is used for this purpose.

A modulated, in particular amplitude-modulated, active and/or reactive power is in particular intended to be understood to mean an active and/or reactive power which has an additional modulation which is outside the fundamental frequency which is specified by the electrical supply network, for example at 50 Hz or 60 Hz. In particular, this means that the active and/or reactive power has a further vibration component which is different from the fundamental frequency and is modulated in such a way that a network oscillation is counteracted.

In particular, a dynamic or oscillating reactive power setting is therefore proposed which actively intervenes in the active power draw of neighboring consumers and thus in the network oscillations. This takes place in particular by the reactive power setting causing a frequency change in the electrical supply network which results in a changed active power draw in neighboring consumers, which counteracts the network oscillations.

For this purpose, the control unit has inputs with which voltage values and current values can be detected, in particular a voltage detected at a network connection point of the wind power installation or of the wind farm and a current detected at the network connection point of the wind power installation or of the wind farm as well as a corresponding voltage set point for the wind power installation or the wind farm, in particular at the network connection point.

Voltage and/or current are preferably detected in order to determine a frequency in the electrical supply network. In order to determine the frequency, the time profiles of the voltage and/or of the current are used, for example, in particular in order to ascertain the vibrations of the amplitude of voltage and/or current.

In particular, it is therefore also proposed to determine a frequency of the electrical supply network from the detected voltage and/or the detected current, in particular in order to examine it for network or power oscillations, for example by observing the amplitudes of current and/or voltage.

Furthermore, it is additionally proposed that a highly sampled signal is used for detecting the voltage and/or the current, in particular in order to determine the frequency with the highest possible resolution, for example with a frequency of more than 100 Hz, preferably between 2 to 5 kHz.

In addition, the control unit has an input for receiving a correction value which is used in particular for correcting the voltage reactive power control, in particular in such a way that the network oscillations are damped.

A feedback control system is provided for damping the network oscillations, which feedback control system is set up, depending on the detected voltage and/or the detected current and the voltage set point and/or the current set point Iset and the correction value, to produce a reactive power set point for the wind power installation or the wind farm.

The network oscillations are preferably damped by means of a reactive power setting. In particular, a voltage set point is used for this purpose.

The correction value preferably comprises at least one control value or the control value is formed therefrom.

The correction value can therefore comprise a multiplicity of variables, for example, wherein at least one variable acts directly on the feedback control system, in particular the voltage reactive power control, for example in the form of a control value for the voltage inside the feedback control system.

The control unit preferably further comprises a filtering system which is set up to produce the correction value from a potentially critical frequency.

In particular, the correction value is therefore ascertained from a frequency or a frequency band which points to a network oscillation or from which it is to be expected that there is a network oscillation. For example, network oscillations occur as a result of the topology of the electrical supply network in the range of 3 Hz. This range is then examined for possible network oscillations by way of the filtering system, for example using a Kalman filter.

The filtering system, for producing the correction value, preferably takes into account at least one comparative value which enables an identification of a critical frequency.

In particular, it is therefore proposed that after a critical frequency has been identified, it is compared with a comparative value, in particular in order to determine whether or not the amplitude of the identified critical frequency is significant. Provided that the amplitude of the critical frequency has been classified as significant by the comparison, a corresponding correction value is determined from this frequency in the form of a control value which acts on the feedback control system of the wind power installation, in particular on the voltage reactive power control.

The filtering system preferably comprises a Kalman filter and a phase correction for this purpose, wherein the Kalman filter is set up to produce a problem vector from a potentially critical frequency, and the phase correction is set up to correct the problem vector in order to obtain a phase-corrected vector which forms a basis for the correction value.

In particular, it is therefore also proposed that vectors are used inside the control unit, in particular with respect to the frequencies.

The filtering system preferably additionally works with $\alpha\beta$ coordinates and has at least one amplitude response threshold, with a critical frequency being identified when said threshold is exceeded.

The control unit preferably further comprises a frequency determination system which is set up to identify, from a multiplicity of frequencies, at least one potentially critical frequency which in particular indicates a network oscillation in the electrical supply network.

In particular, it is also proposed that the control unit is set up to examine a multiplicity of frequencies in a frequency band (for example between 0.1 Hz and 10 Hz) for critical frequencies.

In particular, the frequency determination system therefore identifies, with the help of specifications of the network operator, those among the occurring frequencies in the spectrum of current and/or voltage which have vibration amplitudes which are too high. The specifications of the network operator can feed from empirical values (practical) or expected values (simulative), for example.

These vibration amplitudes which are too high can then be damped by means of the control unit.

In particular, the frequency determination system is thus also set up to provide information via the electrical supply network in the form of a frequency, preferably in the form of a vector.

The frequency determination system preferably comprises at least two different modes in order to identify a potentially critical frequency.

One mode is monitoring a certain frequency which is specified by the network operator, for example.

Another mode is monitoring a frequency range or frequency band which is specified in particular by the network operator, for example.

Provided is a method for controlling a wind power installation and/or a wind farm is further proposed, comprising the steps: detecting at least one voltage and/or one current and exchanging a reactive power with an electrical supply network using a control unit which is described previously or hereinafter so that a network oscillation is counteracted or its amplitude is damped.

In particular, it is therefore proposed to detect the current and/or the voltage and to examine frequency bands contained therein for significant amplitudes, for example by means of a fast Fourier transform. Based on this, a reactive power is then exchanged with the electrical supply network which has an additional modulation which is outside the fundamental frequency which is specified by the electrical supply network, for example at 50 Hz or 60 Hz.

The amplitude of the active and/or reactive power is therefore modulated in such a way that the detected network oscillations are counteracted. For this purpose, the amplitude in the range of 0.8 Hz is modulated as a harmonic with a corresponding fundamental frequency of 50 Hz or 60 Hz, for example.

Provided is a method for controlling an electrical supply network is further proposed, comprising the following steps: specifying a frequency or a frequency range, in particular by way of a network operator, checking whether vibrations occur within the frequency or the frequency range which in particular represent a network oscillation, and controlling the reactive power within the electrical supply network in such a way that the vibration is damped.

In particular, it is therefore proposed to modulate the reactive power within the electrical supply network at specific points, in particular at those which have a high density and power of ohmic consumers.

Controlling the reactive power preferably takes place by means of at least one wind power installation or a wind farm, in particular comprising a control unit which is described previously or hereinafter.

Provided is a wind power installation and/or a wind farm is further proposed, comprising a control unit which is described previously or hereinafter.

BRIEF DESCRIPTION OF THE SEVERAL VIEWS OF THE DRAWINGS

The present invention is now explained in greater detail hereinafter in an exemplary manner using exemplary embodiments with reference to the accompanying figures, wherein the same reference symbols are used for the same or similar components.

DETAILED DESCRIPTION

Figure 1:
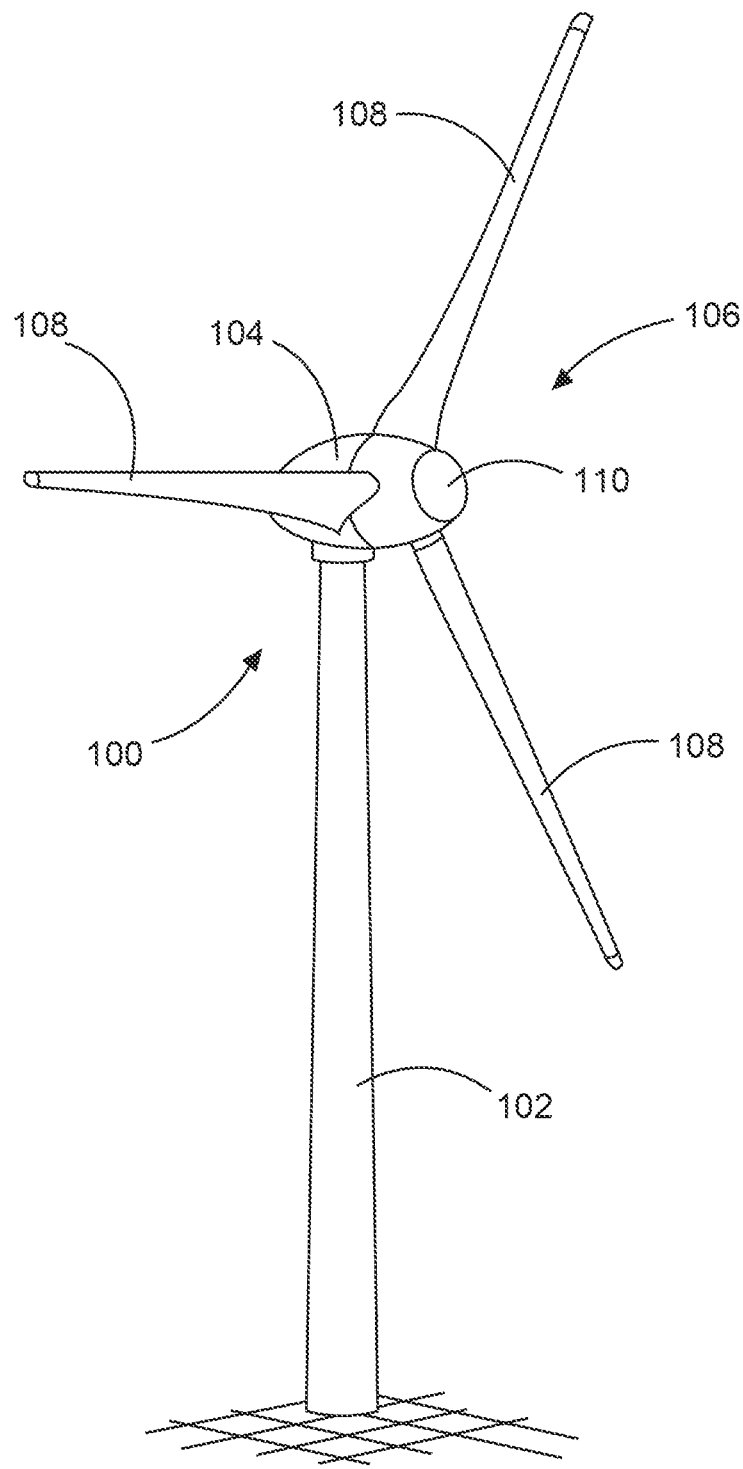
FIG. 1 shows a schematic view of a wind power installation according to one embodiment.

FIG. 1 shows a schematic view of a wind power installation 100 according to one embodiment.

For this purpose, the wind power installation 100 has a tower 102 and a nacelle 104. An aerodynamic rotor 106 with three rotor blades 108 and a spinner 110 is arranged on the nacelle 104. The rotor 106 is transferred into a rotational movement by the wind during operation and thus drives a generator in the nacelle 104.

A control unit (controller) which is described previously or hereinafter is further provided for operating the wind power installation.

Figure 2:
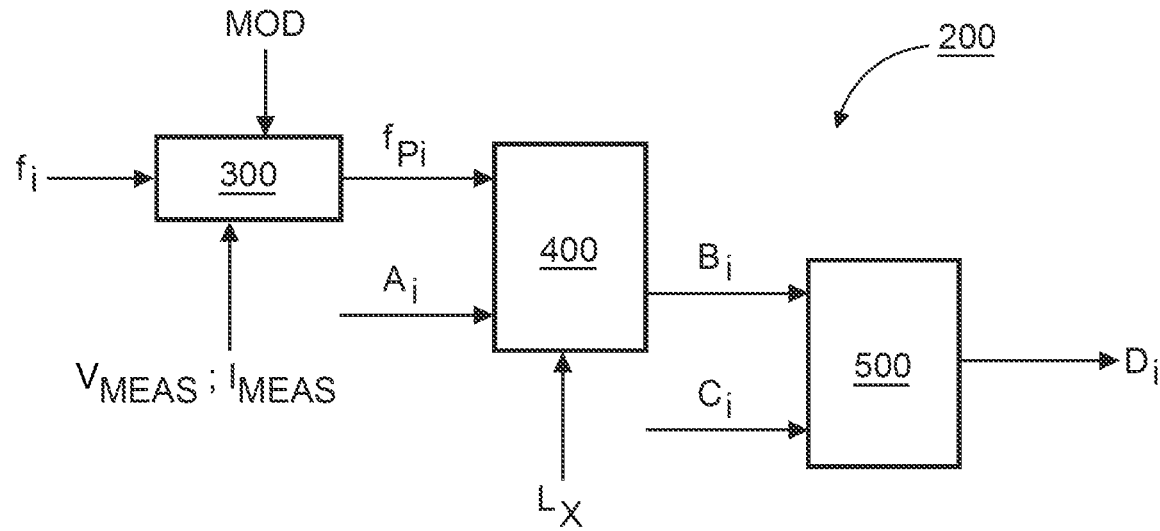
FIG. 2 shows a schematic structure of a control unit (controller) of a wind power installation and/or of a wind farm according to one embodiment.

FIG. 2 shows a schematic structure of a control unit (controller) 200 of a wind power installation and/or of a wind farm according to one embodiment.

The control unit 200 comprises a frequency block (frequency stage or circuitry) 300, a filter block (filter stage or circuitry) 400 and a controller block (controller stage or circuitry) 500.

The frequency block 300 has as an input variable at least one frequency fi, for example in the form of a frequency set point or a frequency specification.

In this case, the input variable fi is in particular used for monitoring a specific frequency range of the electrical supply network, for example frequencies in ranges between 0.1 Hz and 5 Hz.

The input variable is particularly preferably designed as a vector and in particular comprises at least one specification of the network operator, for example in the form of a frequency specification vector fGO, or a frequency band, for example comprising a lower limit value $f_{Low}$ and/or an upper limit value $f_{High}$.

In addition, the operating mode of the frequency block can preferably be set via a further input value, for example the control value MOD, for example between an operation with fixed frequency specifications and an operation with limit values $f_{Low}$ and $f_{High}$, which define a frequency window.

In addition, the frequency block 300 has at least one measurement input in particular for current and/or voltage which preferably has a three-phase design.

In one particularly preferred embodiment, the frequency block is additionally designed to examine in particular the currents and/or voltages detected by the measurement input 310 for vibrations within a frequency window, for example the frequency window between $f_{Low}$ and $f_{High}$. In this case, the fundamental vibration (e.g., 50 Hz) used for power transport in the network is preferably faded out in a targeted manner, and it is examined for significant amplitudes below and/or above the fundamental vibration frequency.

The frequency block 300 determines at least one potentially critical frequency fpi from the input variable.

In this case, a potentially critical frequency fpi is intended to be understood to mean all those frequencies or frequency ranges in which a damping is to be achieved by means of the control unit. These are typically frequencies in which network areas of a large electrical supply network or individual production units in the electrical supply network oscillate against one another, for example by the rotor angle of synchronous machines vibrating in opposite directions at this frequency. These oscillations, also referred to as network oscillations, can result in undesired current flows between network areas or production units which under certain circumstances are damaging to operating equipment within the electrical supply network, such as transformers or lines, for example. Network oscillations of this type may also result in mechanical torsional loads on the shafts of power stations which reduce the life span of the power station shaft.

In addition, the potentially critical frequency fpi is used as an input signal for the filter block 400.

Figure 3:
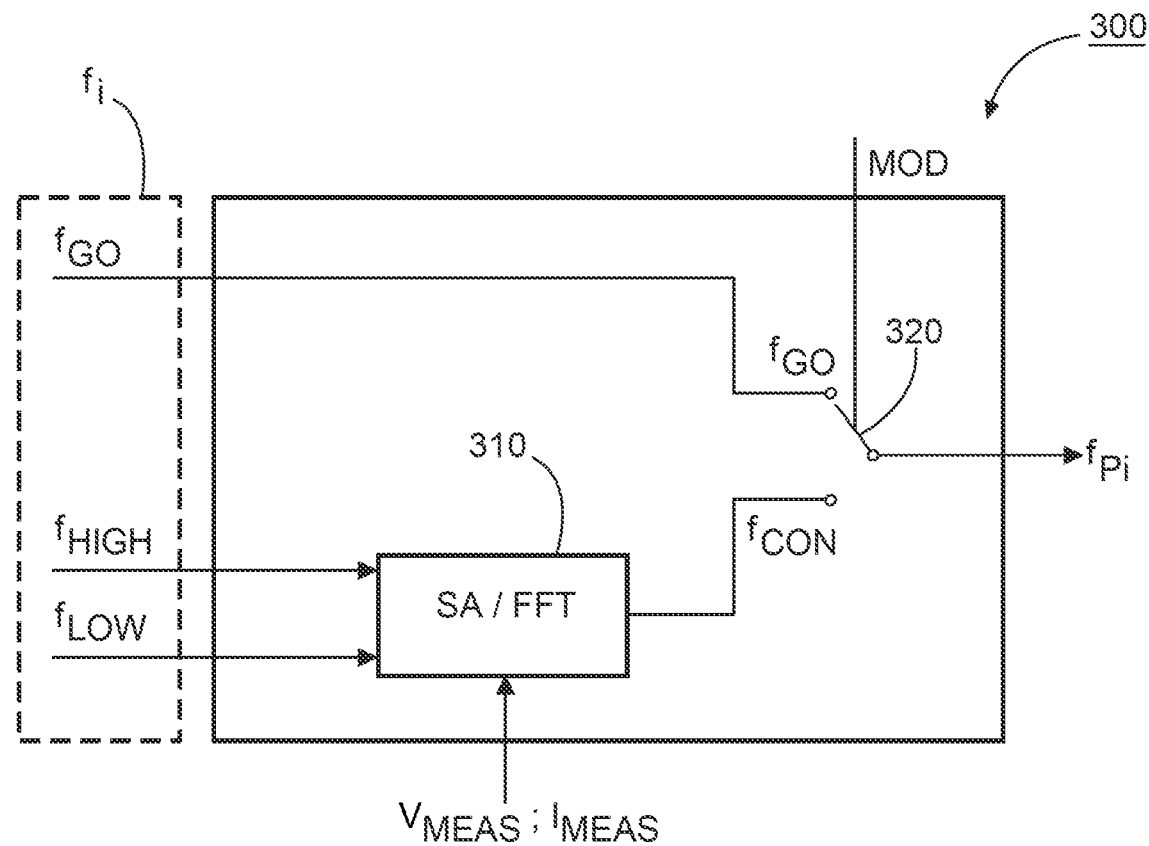
FIG. 3 shows a schematic structure of a frequency block of a control unit, in particular as shown in FIG. 2.

A further embodiment of a frequency block 300 of this type can be inferred from FIG. 3.

The filter block 400 has as an input variable at least one or the potentially critical frequency fpi and a comparative value Ai.

By comparing the potentially critical frequency fpi with the comparative value Ai, the filter block 400 selects all those vibrations which represent a critical frequency fki and ascertains a correction value Bi for this.

The correction value Bi, which can also be understood as damping, is subsequently used as an input signal for the controller block 500.

Figure 4:
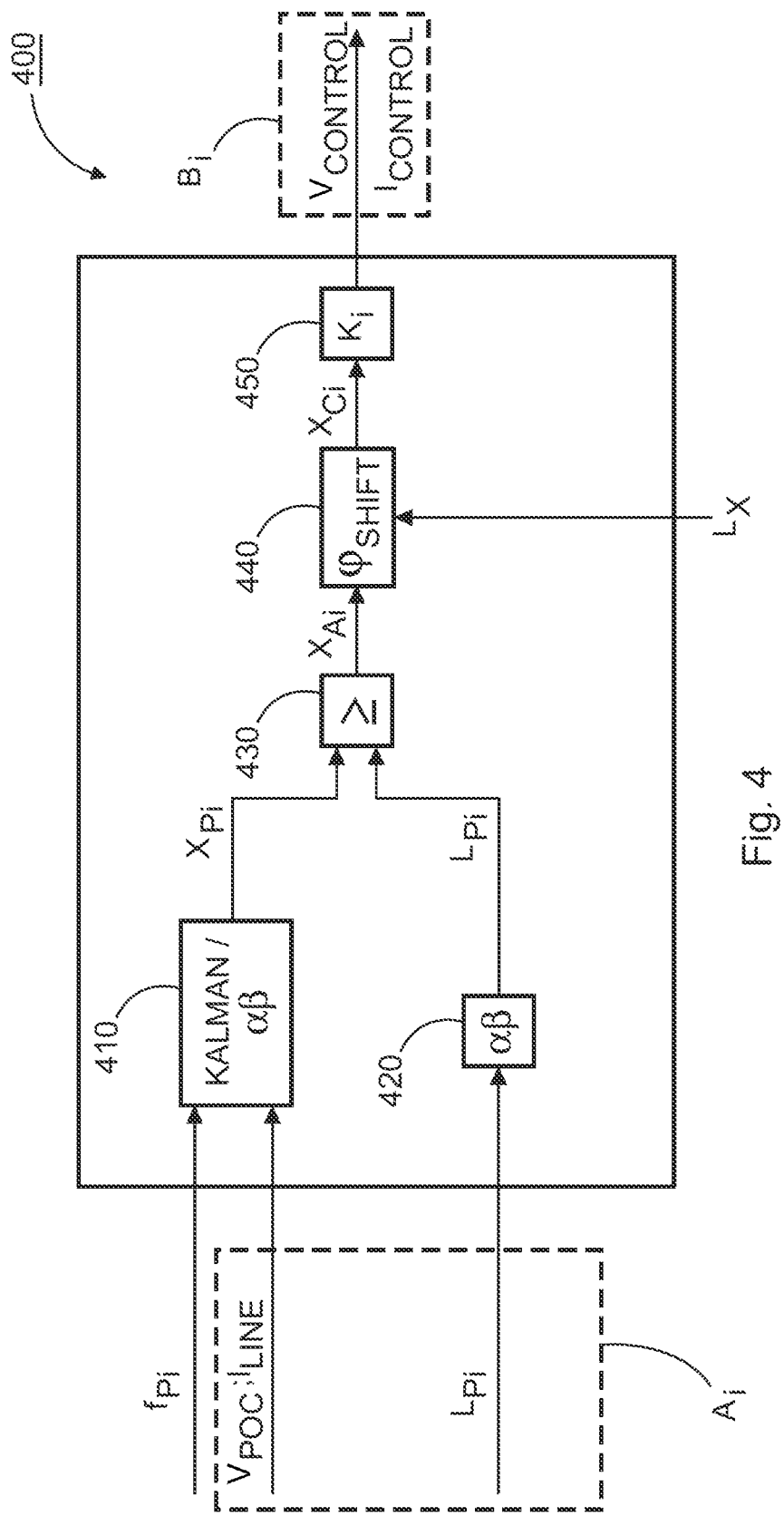
FIG. 4 shows a schematic structure of a filter block of a control unit, in particular as shown in FIG. 2.

One further embodiment of a filter block 400 of this type can be inferred from FIG. 4.

The controller block 500 has as an input variable at least the correction value Bi and reference and measurement variables Ci from which the control variable Di is ascertained.

The control variable Di is subsequently used in order to control a generator and/or an inverter which is connected to the generator, in particular in order to counteract amplitudes which are too high at potentially critical frequencies within the electrical supply network.

Figure 5:
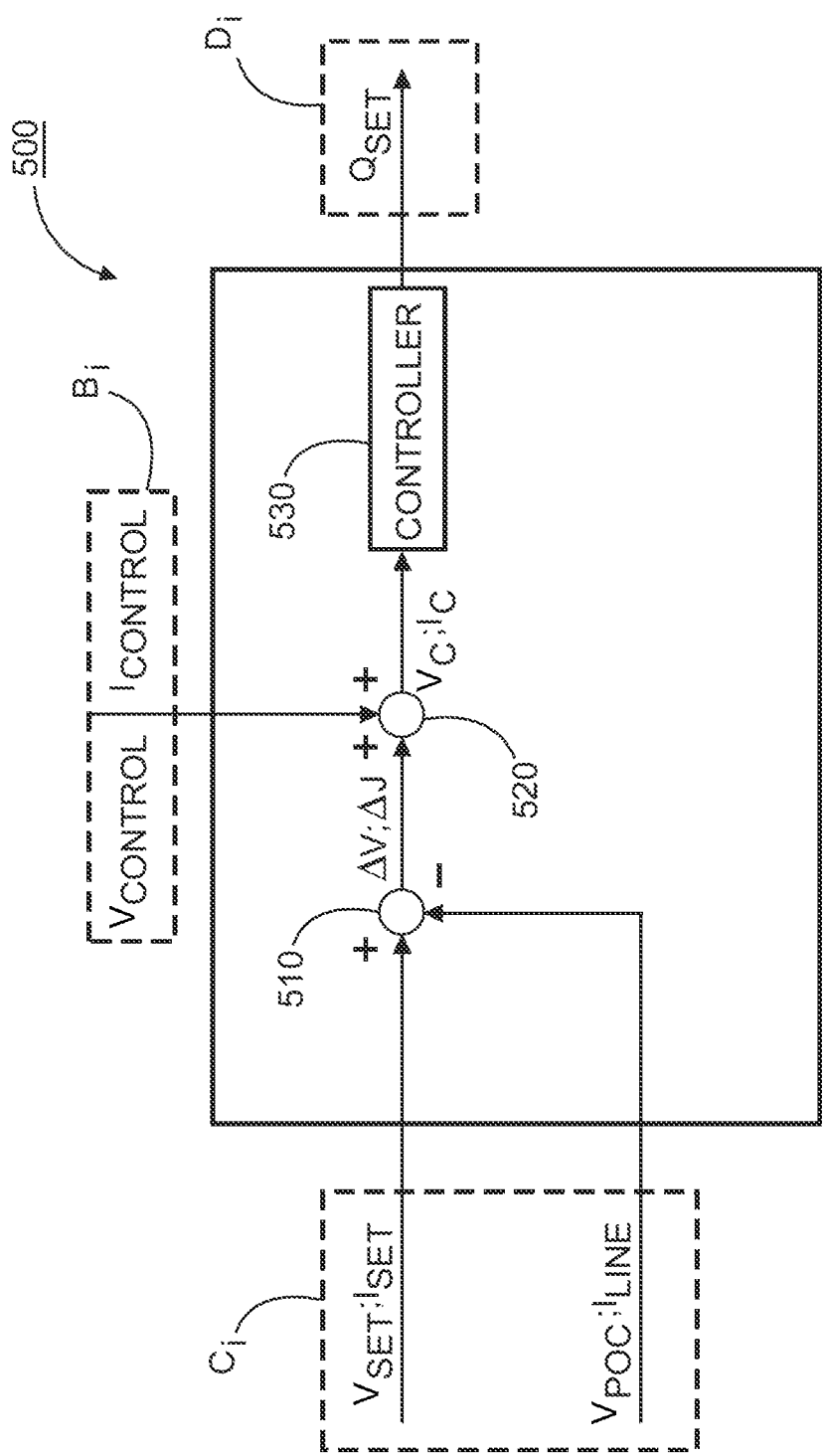
FIG. 5 shows a schematic structure of a controller block of a control unit, in particular as shown in FIG. 2.

One further embodiment of a controller block of this type can be inferred from FIG. 5.

The control system 200 thus creates at least one possibility for counteracting critical situations, in particular critical frequencies, within an electrical supply network by means of wind power installations.

In one particularly preferred embodiment, the control system is used to counteract subsynchronous resonance in the electrical supply network, in particular by means of reactive power control of the wind power installations and/or of the wind farm.

In particular, it is therefore proposed to modulate the reactive power in such a way that neighboring consumers draw a different active power due to the changed frequency in the electrical supply network, owing to the changed reactive power.

This dynamic reactive power setting actively intervenes in the active power draw of neighboring consumers and thus in the network oscillations.

FIG. 3 shows a schematic structure of a frequency block of a control unit 300, in particular as shown in FIG. 2.

The frequency block 300 has as an input variable at least one frequency fi, for example a frequency specification vector $f_{Go}$ or a lower limit value f Low and an upper limit value $f_{High}$ for a frequency band $f_{High}$, $f_{Low}$ which is to be monitored.

The frequency specification vector $f_{Go}$ is preferably specified by the network operator and is between 0.1 Hz and 5 Hz, for example.

The frequency band is selected in such a way, for example, that it comprises a frequency range in which interferences can be expected or can be assumed to be sufficiently likely. The frequency bands are preferably determined depending on a prevailing network topology.

Within the frequency band which is to be monitored, the frequency block 300 therefore searches for conspicuous patterns and/or frequencies fcon, for example by means of an analysis block 310. This can take place by means of a spectral analysis SA or a (Fast) Fourier transform FFT, for example.

In this case, determining the conspicuous frequencies fcon further preferably results from measured voltages Vmeas and currents Imeas which are provided to the analysis block 310 via a measurement input.

In particular, it is therefore also proposed to ascertain critical frequencies from the spectra of voltages Vmeas and currents Imeas. This can take place, for example, by means of the amplitudes of the voltages Vmeas and currents Imeas, or via auxiliary variables calculated from these measurement values or by using historical level values of the frequencies. In this case, an amplitude at a certain frequency is preferably considered to be conspicuous if it has exceeded a certain threshold compared to a historical mean-level value. For example, for vibrations in the measured voltages and/or currents, a limit of 0.5% of the nominal value of the fundamental vibration, i.e., the nominal voltage or the nominal current of the fundamental vibration, can be specified, so that only clearly perceptible vibrations are identified as critical frequencies.

Depending on the operating mode MOD, the corresponding frequency $f_{GO}$, $f_{CON}$ can be output or classified as a potentially critical frequency fpi via a mode circuit 320.

In particular, it is therefore proposed to determine a potentially critical frequency fpi from the frequency fi.

The output of the potentially critical frequency or frequencies fpi can take place by means of a vector, for example. This vector can also be referred to as a result vector of the frequency block 300.

The frequency block 300 is thus in particular set up to provide information regarding the electrical supply network in the form of a frequency fpi, preferably in the form of a vector comprising at least one frequency fpi, depending on a detected and/or determined frequency fi.

In addition, the potentially critical frequency fpi can be used as an input signal for a filter block 400, as shown in FIG. 2, for example.

FIG. 4 shows a schematic structure of a filter block 400 of a control unit, in particular as shown in FIG. 2.

The filter block 400 has as an input variable at least one or the potentially critical frequency fpi, as preferably generated in FIG. 3, and a comparative value Ai.

The comparative value Ai comprises a detected voltage Vmeas and/or a detected current Imeas as well as a minimum amplitude response threshold Lpi for each potentially critical frequency fpi, for example.

The detected voltage Vmeas is preferably the voltage Vpoc which can be detected at the network connection point of the wind farm or the voltage which can be detected at the low voltage terminals of the wind power installation.

The detected current Imeas is preferably the current Iline of a line between a wind power installation or wind farm and an electrical supply network.

The minimum amplitude response threshold Lpi corresponds to a minimum from which a response should take place. The minimum amplitude response threshold Lpi is preferably selected in such a way that a response only takes place if vibrations in the voltage, for example, are greater than a certain percentage of the nominal voltage of the fundamental vibration, for example 0.5%.

Unless the potentially critical frequencies are sufficiently known, the amplitude response threshold is defined as a continuous frequency spectrum. An applicable amplitude response threshold therefore exists for each amplitude.

The filter block 400 preferably determines a problem vector Xpi from the potentially critical frequency fpi and/or the detected voltage Vmeas and/or the detected current Imeas by means of a Kalman filter 410, for example in αβ coordinates.

In this case, the problem vector Xpi preferably comprises the amplitude and the phase position of the vibration component in the case of the frequency fpi. In particular, the vibration component is the component in the frequency spectrum of current or voltage (or an auxiliary variable) which is at a potentially critical frequency fpi.

Determining the problem vector Xpi preferably takes place in αβ coordinates.

In addition, the minimum amplitude response threshold Lpi is preferably transformed into αβ coordinates, for example by means of an αβ transformation 420.

The problem vector Xpi is subsequently compared with the minimum amplitude response threshold Lpi in a comparator 430.

Provided that the vector(s) have a plurality of elements, each element of the problem vector Xpi is compared with a respective amplitude response threshold Lpi.

Provided that elements of the problem vector Xpi exceed their respective amplitude response threshold Lpi, these elements are classified as an actual critical frequency.

The output of the comparator 430 is therefore preferably also a vector Xai, wherein it only comprises the actual critical frequencies.

A phase correction 440 is subsequently preferably carried out, i.e., the individual elements of the vector Xai are corrected in their phase position according to the measurements, i.e., current measurement and/or voltage measurement, such that a phase-corrected vector Xci emerges.

In this case, the correction preferably takes place using a correction factor Lx which is preferably such that even more corrections can be carried out, in particular with respect to the controlled system.

The phase-corrected vector Xci is subsequently multiplied by a proportionality factor ki, represented by block 450.

The result from this is a vector with voltage values and/or current values with vibration components at the actual critical frequencies.

The voltage values and/or current values obtained in this way can subsequently be used as control values Vcontrol, Icontrol. The control values Vcontrol, Icontrol can also be referred to as correction values Bi. A limitation is particularly preferably further provided which limits the control values Vcontrol, Icontrol to a maximum.

The filter block 400 therefore produces correction values Bi, in particular for voltage and/or current, from potentially critical frequencies fpi and comparative values Ai.

The control values Vcontrol, Icontrol can also be given as correction values Bi to a controller block, in particular as input signals to a controller block 500 as shown in FIG. 5, for example.

FIG. 5 shows a schematic structure of a controller block 500 of a control unit, in particular as shown in FIG. 2.

The controller block 500 has as an input variable the correction value Bi, in particular in the form of the control values Vcontrol, Icontrol, and reference and measurement variables Ci, in particular a voltage set point Vset and/or a current set point Iset and a detected voltage Vpoc and/or a detected current Iline.

The detected voltage Vpoc can also be referred to as an actual voltage.

The input signals, voltage set point Vset or current set point Iset and detected voltage Vpoc or detected current Iline, are subtracted from one another, for example by means of a subtraction 510, in order to ascertain a voltage deviation ΔV or current deviation ΔI.

The voltage deviation ΔV or the current deviation ΔI thus forms a control deviation.

The control value Vcontrol or the control value Icontrol is added to this control deviation, i.e., the voltage deviation ΔV or the current deviation ΔI, for example by means of an adder 520, in order to ascertain a voltage control value Vc or a current control value Ic. The control values Vcontrol, Icontrol can be ascertained for this purpose as shown in FIG. 4, for example.

The voltage control value Vc or the current control value Ic is subsequently supplied to a controller 530 which is designed as a P controller or PI controller, for example.

The controller 530 then produces a reactive power set point Qset from the voltage control value Vc or the current control value Ic, which reactive power set point can be transferred to an inverter control system (controller) of the wind power installation, for example, in order to produce a correspondingly amplitude-modulated reactive power Qmod or Qpoc.

Figure 6:
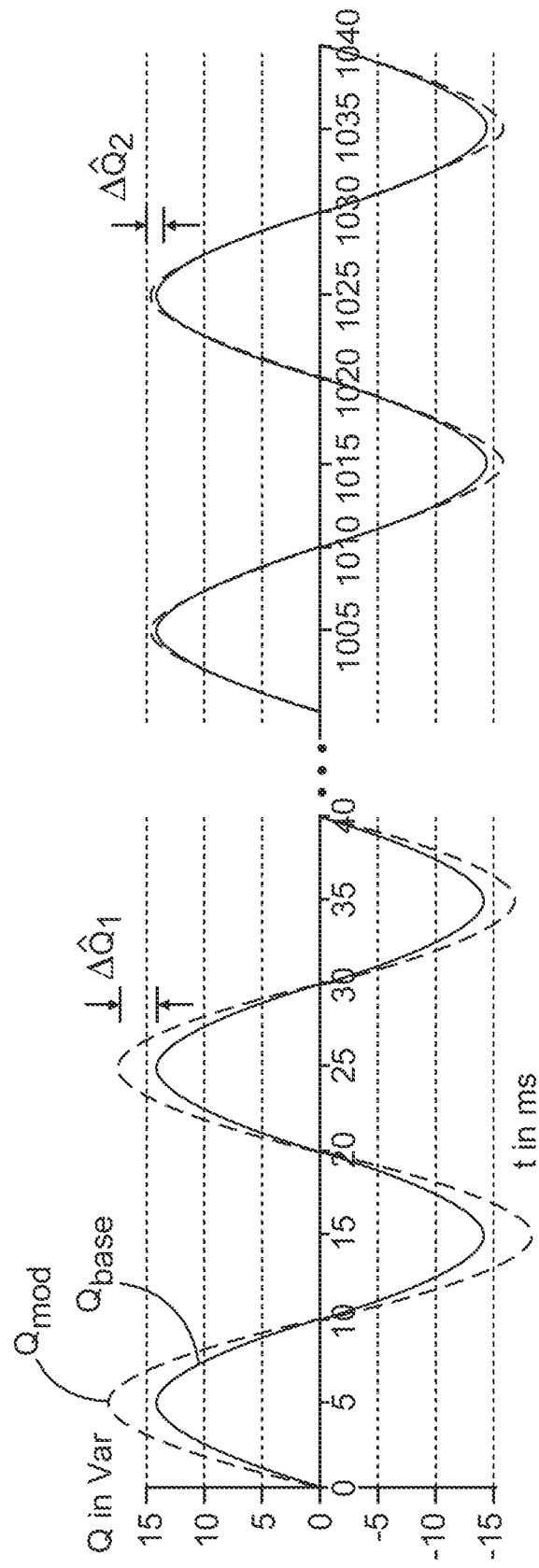
FIG. 6 shows an amplitude-modulated reactive power.

FIG. 6 shows an amplitude-modulated reactive power Qmod which has been produced by a converter which has a control unit which is described previously or hereinafter and/or performs a method which is described previously or hereinafter.

The amplitude-modulated reactive power Qmod has a fundamental wave Qbase which vibrates with a frequency of 50 Hz.

A harmonic is modulated on this fundamental wave Qbase, the amplitude of which vibrates with time by a magnitude ΔQ1 or ΔQ2, for example at 0.8 Hz.

In this case, this harmonic is in particular modulated in such a way that the detected network oscillations are counteracted.

The reactive power which is exchanged with the electrical supply network therefore has an additional modulation which is outside the fundamental frequency which is specified by the electrical supply network, for example at 50 Hz. The amplitude of the reactive power is therefore modulated in such a way that the detected network oscillations are counteracted.

Figure 7:
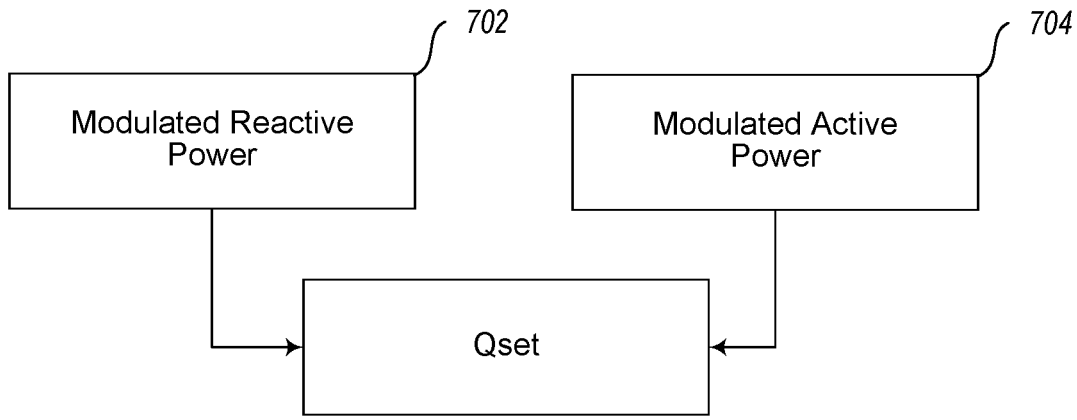
FIG. 7 shows a reactive power set point (Qset) produced for a modulated, preferably amplitude-modulated, reactive power and/or active power of a converter.

FIG. 7 shows a reactive power set point (Qset) produced for a modulated, preferably amplitude-modulated, reactive power 702 and/or active power 704 of a converter.

Figure 8:
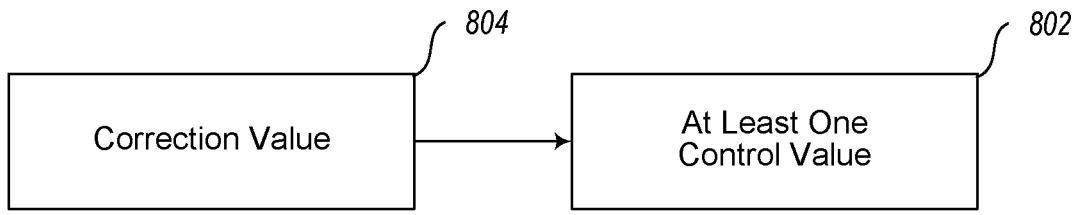
FIG. 8 shows at least one control value formed from a correction value.

The correction value preferably comprises at least one control value or the control value is formed therefrom. FIG. 8 shows at least one control value 802 formed from the correction value 804.

Figure 9:
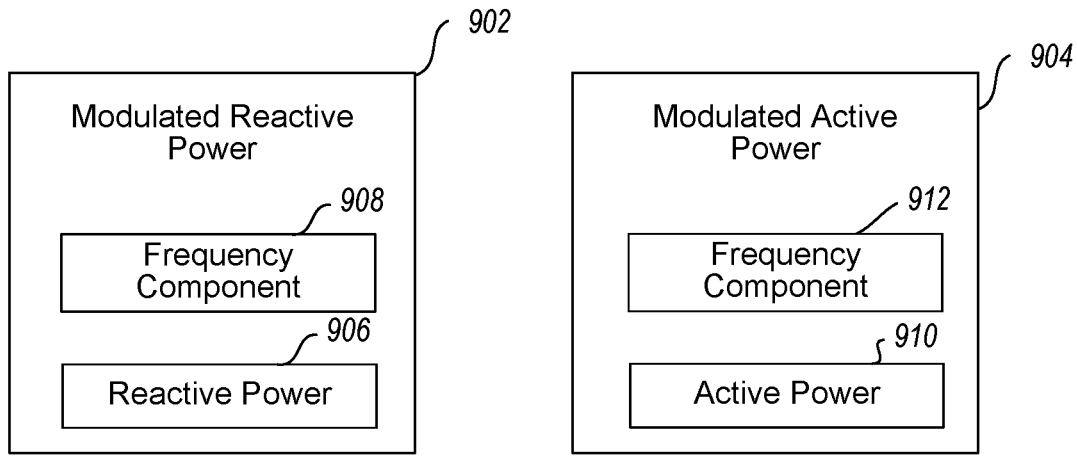
FIG. 9 shows a modulated reactive power and a modulated active power.

FIG. 9 shows a modulated reactive power 902 and a modulated active power 904. The modulated reactive power 902 is shown as a reactive power 906 having an additional component 908, which may be different from a fundamental frequency. The modulated active power 904 is shown as an active power 910 having an additional component 912, which may be different from a fundamental frequency.

REFERENCE SYMBOLS 100 wind power installation
102 tower of the wind power installation
104 nacelle of the wind power installation
106 aerodynamic rotor of the wind power installation
108 rotor blade of the wind power installation
110 spinner of the wind power installation
200 control unit
300 frequency block
310 measurement input of the frequency block
400 filter block
500 controller block
Ai comparative value
Bi correction value
Ci reference variable
Di control variable
fi frequency, in particular frequency set point
fCON conspicuous frequency
fGO frequency specification of a network operator
fHigh upper limit value of the frequency band
fLow lower limit value of the frequency band
fpi potential critical frequency
fki critical frequency
Imeas detected current, in particular of the electrical supply network
Iline detected current between wind power installation and electrical supply network
Mi measurement input, in particular in three phases
MOD control value (operating mode)
Vc voltage control value
Vcontrol control value
Vmeas detected voltage, in particular of the electrical supply network
Vpoc voltage at the network connection point
ΔV voltage deviation
Pmod amplitude-modulated active power
Qmod amplitude-modulated reactive power
ΔQ1, ΔQ2 magnitude of the amplitude vibration The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller for a converter, comprising:
   a first input configured to receive a detected voltage value and/or a detected current value; and
   a second input configured to receive a voltage set point and/or a current set point,
   wherein the controller is configured to:
      perform filtering on a potentially critical electrical frequency, wherein the potentially critical electrical frequency is a frequency to be dampened;
      determine a correction value based on filtering on the potentially critical electrical frequency; and
      determine a reactive power set point influencing a modulated reactive and/or modulated active power of the converter depending on the detected voltage value and/or the detected current value, the voltage set point and/or the current set point and the correction value.

2. The controller as claimed in claim 1, wherein the controller is configured to be implemented within a wind power installation or a wind farm.

3. The controller as claimed in claim 1, wherein the modulated reactive and/or the modulated active power of the converter is an amplitude-modulated reactive and/or an amplitude-modulated active power of the converter.

4. The controller as claimed in claim 1, wherein:
the correction value includes at least one control value; or
the at least one control value is formed from the correction value.

5. The controller as claimed in claim 1, wherein the controller is configured to determine the correction value based on the detected voltage value and/or the detected current value that enables an identification of a critical electrical frequency.

6. The controller as claimed in claim 1, wherein:
performing the filtering includes applying a Kalman filter to determine a problem vector from the potentially critical electrical frequency, and
the controller is configured to perform phase correction to correct a vector of critical electrical frequencies and to obtain a phase-corrected vector that forms a basis for the correction value.

7. The controller as claimed in claim 1, wherein the controller is configured to:
perform the filtering in $\alpha\beta$ coordinates; and
identify a critical electrical frequency in response to a problem vector exceeding at least one amplitude response threshold.

8. The controller as claimed in claim 1, wherein the controller is configured to:
identify, from a plurality of electrical frequencies, the potentially critical electrical frequency.

9. The controller as claimed in claim 8, wherein the potentially critical electrical frequency indicates a network oscillation in an electrical supply network.

10. The controller as claimed in claim 8, wherein the controller is configured to operate in one of at least two different modes in order to identify the potentially critical electrical frequency.

11. A method for controlling a converter, comprising:
detecting at least one voltage and/or at least one current;
receiving a voltage set point and/or a current set point;
performing filtering on a potentially critical electrical frequency, wherein the potentially critical electrical frequency is a frequency to be dampened;
determining a correction value based on filtering on the potentially critical electrical frequency;
determining a reactive power set point influencing a modulated reactive and/or a modulated active power of the converter depending on the detected at least one voltage value and/or the detected at least one current value, the voltage set point and/or the current set point and the correction value; and
exchanging the modulated reactive power with an electrical supply network to dampen or counteract a network oscillation.

12. The method as claimed in claim 11, wherein the converter is configured to be implemented within a wind power installation and/or a wind farm.

13. A method for controlling an electrical supply network, comprising:
receiving, by a controller, a frequency or a frequency range that is set by a network operator;
performing filtering on a potentially critical electrical frequency, wherein the potentially critical electrical frequency is a frequency to be dampened;
determining a correction value based on filtering on the potentially critical electrical frequency;
determining, by the controller, whether vibrations of a network oscillation occur within the frequency or the frequency range; and
in response to determining that the vibrations of the network oscillation occur within the frequency or the frequency range, controlling reactive power in the electrical supply network to dampen the vibrations.

14. The method as claimed in claim 13, wherein controlling the reactive power includes:
detecting at least one voltage and/or at least one current;
receiving a voltage set point and/or a current set point; and
determining, by a controller of at least one wind power installation or a wind farm, a reactive power set point influencing the reactive and/or an active power depending on the detected at least one voltage value and/or the detected at least one current value, the voltage set point and/or the current set point and the correction value.

* * * * *